United States Patent
Sibert et al.

(10) Patent No.: US 12,481,996 B2
(45) Date of Patent: Nov. 25, 2025

(54) SECURE ELEMENT HAVING MULTIPLE CRS APPLETS

(71) Applicant: Apple Inc., Cupertino, CA (US)

(72) Inventors: Herve Sibert, Le Mans (FR); Oren M. Elrad, San Francisco, CA (US); Jerrold V. Hauck, Windermere, FL (US); Onur E. Tackin, Sunnyvale, CA (US); Zachary A. Rosen, San Francisco, CA (US); Matthias Lerch, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/487,723

(22) Filed: Oct. 16, 2023

(65) Prior Publication Data

US 2024/0185245 A1 Jun. 6, 2024

Related U.S. Application Data

(63) Continuation of application No. 17/384,488, filed on Jul. 23, 2021, now Pat. No. 11,790,365, which is a
(Continued)

(51) Int. Cl.
*G06Q 20/40* (2012.01)
*G06F 21/31* (2013.01)
(Continued)

(52) U.S. Cl.
CPC ....... *G06Q 20/40145* (2013.01); *G06F 21/31* (2013.01); *G06F 21/32* (2013.01);
(Continued)

(58) Field of Classification Search
CPC ..... G06Q 20/00–425; H04W 12/00–80; G06F 21/00–88; H04L 9/00–50
See application file for complete search history.

(56) References Cited

U.S. PATENT DOCUMENTS 8,196,131 B1  6/2012  von Behren
8,775,757 B2  7/2014  Polzin et al.
(Continued)

FOREIGN PATENT DOCUMENTS

CN  105474224 A  4/2016
CN  105684009 A  6/2016
(Continued)

OTHER PUBLICATIONS

GlobalPlatform Card Contactless Services Card Specification v2.2-Amendment C Version 1.1, Apr. 2013 (Year: 2013).*
(Continued)

*Primary Examiner* — Chenyuh Kuo
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to secure data storage. In various embodiments, a mobile device includes a wireless interface, a secure element, and a secure circuit. The secure element is configured to store confidential information associated with a plurality of users and to receive a request to communicate the confidential information associated with a particular one of the plurality of users. The secure element is further configured to communicate, via the wireless interface, the confidential information associated with the particular user in response to an authentication of the particular user. The secure circuit is configured to perform the authentication of the particular user. In some embodiments, the mobile device also includes a biosensor configured to collect biometric information from a user of the mobile device. In such an embodiment, the secure circuit is configured to store biometric information collected from the plurality of users by the biosensor.

20 Claims, 10 Drawing Sheets

Related U.S. Application Data continuation of application No. 15/709,925, filed on Sep. 20, 2017, now Pat. No. 11,074,582.

(60) Provisional application No. 62/399,297, filed on Sep. 23, 2016.

(51) Int. Cl.
| | | |
|---|---|---|
| *G06F 21/32* | (2013.01) | |
| *G06Q 20/20* | (2012.01) | |
| *G06Q 20/32* | (2012.01) | |
| *G06Q 20/38* | (2012.01) | |
| *H04L 9/32* | (2006.01) | |
| *H04W 12/06* | (2021.01) | |
| *H04W 12/065* | (2021.01) | |

(52) U.S. Cl.
CPC ....... *G06Q 20/204* (2013.01); *G06Q 20/3278* (2013.01); *G06Q 20/382* (2013.01); *G06Q 20/4014* (2013.01); *H04L 9/3231* (2013.01); *H04W 12/065* (2021.01); *H04W 12/068* (2021.01)

(56) References Cited

U.S. PATENT DOCUMENTS

| | | | |
|---|---|---|---|
| 8,832,465 B2 | 9/2014 | Gulati et al. | |
| 9,503,894 B2* | 11/2016 | Shanmugam | G06F 21/32 345/174 |
| 9,547,778 B1 | 1/2017 | Paaske et al. | |
| 2006/0213982 A1 | 9/2006 | Cannon et al. | |
| 2013/0174266 A1* | 7/2013 | Smrz | H04W 4/60 726/26 |
| 2014/0058937 A1* | 2/2014 | Watson | G06Q 20/425 705/41 |
| 2014/0143826 A1* | 5/2014 | Sharp | H04L 63/105 726/1 |
| 2014/0298484 A1* | 10/2014 | Sung | H04W 12/08 726/27 |
| 2015/0078550 A1 | 3/2015 | Ferguson et al. | |
| 2015/0095238 A1* | 4/2015 | Khan | G06Q 20/382 705/71 |
| 2015/0127549 A1* | 5/2015 | Khan | G06Q 20/20 705/71 |
| 2015/0257004 A1 | 9/2015 | Shanmugam et al. | |
| 2015/0348008 A1 | 12/2015 | Khan | |
| 2016/0171192 A1* | 6/2016 | Holz | G06F 21/6245 726/19 |
| 2017/0262267 A1* | 9/2017 | Hans | G06F 9/44505 |

FOREIGN PATENT DOCUMENTS

| | | | |
|---|---|---|---|
| CN | 105794244 A | | 7/2016 |
| JP | 2015207217 A | | 11/2015 |
| KR | 20150016369 A | * | 2/2015 |
| WO | 9219078 | | 10/1992 |
| WO | 2012/042262 | | 4/2012 |
| WO | 2014/031183 A1 | | 2/2014 |

OTHER PUBLICATIONS

IOS Security—White Paper, Apple Inc., Mar. 2017, pp. 1-68.
Invitation to pay additional fees & partial International Search in Application No. PCT/US2017/053107 mailed Dec. 8, 2017, 15 pages.
Contactless Services: Card Specification v2. 2—Amendment C, Version 1.1.1, GlobalPlatform Card Technology, Jul. 31, 2014, XP055189214, 126 pages.
International Search Report & Written Opinion in in Application No. PCT/US2017/053107 mailed Mar. 29, 2018, 24 pages.
Written Opinion of the International Preliminary Examining Authority in Appl. No. PCT/US2017/053107, mailed Aug. 20, 2018, 13 pages.
International Preliminary Report on Patentability in PCT Appl. No. PCT/US2017/053107 mailed Jan. 7, 2019, 16 pages.
Examination Report in Australian Appl. No. 2017330439 mailed Feb. 14, 2020, 3 pages.
GlobalPlatform, Inc., The Introduction to Secure Elements, May 2018, 9 pages.
Examination Report No. 3 in Australian Appl. No. 2017330439 mailed Oct. 16, 2020, 8 pages.
Office Action in Chinese Appl. No. 201780053136.0 mailed Oct. 12, 2022, 8 pages.

* cited by examiner

SECURE ELEMENT HAVING MULTIPLE CRS APPLETS

The present application is a continuation of U.S. application Ser. No. 17/384,488, entitled "SECURE ELEMENT HAVING MULTIPLE USERS," filed Jul. 23, 2021 (now U.S. Pat. No. 11,790,365), which is a continuation of U.S. application Ser. No. 15/709,925, entitled "SECURE ELEMENT HAVING MULTIPLE USERS," filed Sep. 20, 2017 (now U.S. Pat. No. 11,074,582), which claims priority to U.S. Provisional App. No. 62/399,297, entitled "SECURE ELEMENT HAVING MULTIPLE USERS," filed Sep. 23, 2016; the disclosures of each of the above-referenced applications are incorporated by reference herein in their entireties.

BACKGROUND

Technical Field

This disclosure relates generally to computing devices, and, more specifically, to securely storing user data on a computing device.

Description of the Related Art

In an effort to reduce transaction fraud, modern credit cards are now being equipped with an integrated circuit for storing and communicating transaction information. When a customer attempts to conduct a transaction, the customer inserts the card into a reader, which interfaces with the integrated circuit to obtain information usable to authenticate the customer to a payment system. In some instances, this interfacing may include asking the integrated circuit to digitally sign information using an internally stored private key.

Various techniques are also being developed to incorporate similar functionality into mobile devices in order to enable them to conduct transactions. For example, when a customer wants to purchase something, the customer may present the device to a point of sale terminal, which may communicate wirelessly with the mobile device. The mobile device may prompt the user with a request to authorize the transaction and convey payment information in response to confirmation from the user.

SUMMARY

The present disclosure describes embodiments in which a secure element is used to store confidential information of multiple users. In one embodiment, a mobile device includes a wireless interface (e.g., a near field communication (NFC) interface), a secure element, and a secure circuit. The secure element is configured to store confidential information associated with a plurality of users, receive a request to communicate the confidential information associated with a particular one of the plurality of users, and communicate, via the wireless interface, the confidential information associated with the particular user in response to an authentication of the particular user. The secure circuit is configured to perform the authentication of the particular user. In some embodiments, the mobile device includes a biosensor configured to collect biometric information from a user of the mobile device. In such an embodiment, the secure circuit is configured to store biometric information collected from the plurality of users by the biosensor, receive a request to perform the authentication of the particular user, and perform the authentication by retrieving the stored biometric information of the particular user and comparing the retrieved biometric information with biometric information received from the biosensor.

In some embodiments, the secure element is configured to instantiate a plurality of instances of a contactless registry service (CRS) applet, each instance of the CRS applet being associated with a respective one of the plurality of users and being executable by the secure element to enable communication of that respective user's confidential information via the wireless interface. In some embodiments, the secure element is configured to instantiate a single instance of a contactless registry service (CRS) applet executable by the secure element to maintain a mapping associating a first one of the plurality of users with the first user's confidential information stored in the secure element, and to permit, based on the mapping, communication of the first user's confidential information when the first user is identified as the active user. In some embodiments, the secure circuit is configured to store a mapping associating a first of the plurality of users with a set of applets in the secure element that maintain confidential information of the first user, receive, from the secure element, a request to execute an applet in the set to cause communication of the first user's confidential information via the wireless interface, and determine whether execution of the applet is permitted based on the mapping and performance of an authentication of the first user.

Figure 1:
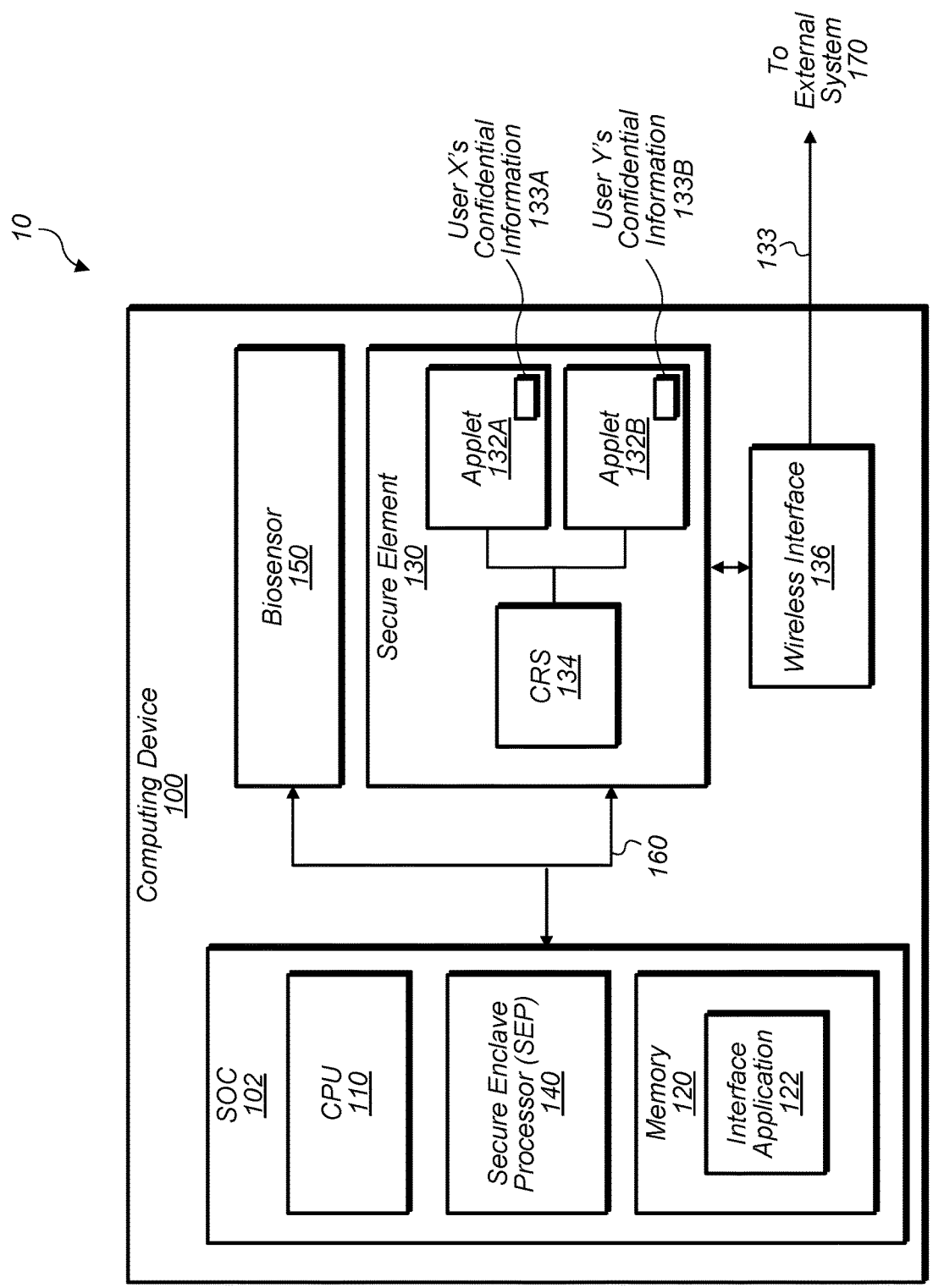
FIG. 1 is a block diagram illustrating an example of a computing device having a secure element configured to store user information associated with multiple users.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—

[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure element configured to store confidential information associated with a plurality of users" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may be described as having a first user and a second user. The terms "first" and "second" can refer to any users and are not limited to an initial two users to use the mobile device.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A problem with traditional mobile device payment schemes (as well as smart cards) is that the devices being used do not allow the storage of confidential information belonging to multiple users as well as provide protection of that information such that a given user is able to only access his or her information. As will be described below, in various embodiments, a computing device 100 may include a secure element configured to store confidential information for multiple users sharing device 100 and a wireless interface configured to communicate that information to an external system such as a merchant system requesting a user's payment information for conducting a transaction. If a particular user requests that his or her confidential information be communicated to the external system, the secure element may employ various techniques discussed below in order to authenticate the user and ensure that the user is not attempting to access some other user's confidential information.

Turning now to FIG. 1, a block diagram of a computing device 100 is depicted. In the illustrated embodiment, computing device 100 includes a system on a chip (SOC) 102 having a central processing unit 110, memory 120 including an interface application 122, and secure enclave processor (SEP) 140. Computing device 100 also includes secure element 130, a wireless interface 136, and a biosensor 150 coupled to SOC 102 via an interconnect 160. As shown, secure element 130 includes multiple applets 132 and one or more contactless registry service (CRS) applets 134. In some embodiments, computing device 100 may be implemented differently than shown. For example, in some embodiments, wireless interface 136 may be included in secure element 130; CPU 110, memory 120, and SEP 140 may not be contained within an SOC; device 100 may include multiple secure elements 130; etc. Computing device 100 may be any suitable computing device such as a mobile phone, tablet, watch, laptop, desktop computer, etc.

Interface application 122 is an application executable by CPU 110 to enable communication between secure element 130 and an external system 170. In some embodiments, interface application 122 may be a wallet application executable to maintain confidential information about a user in secure element 130 and allow a user to access that information for performing various actions such as authenticating the user with external system 170, conducting a transaction with system 170, etc. Accordingly, interface application 122 may present one or more menus to allow a user enter various information and request the use of wireless interface 136, for example. In some embodiments, application 122 may be part of an operating system executable to manage various aspects of device 100. In other embodiments, application 122 may be independent of the operating system.

Secure element 130 is a secure circuit configured to store confidential information 133 belonging to multiple users and facilitate communication of that information 133 to external system 170 via wireless interface 136. As used herein, the term "secure circuit" refers to a circuit that protects an isolated, internal resource, such as information 133, from being directly accessed by an external circuit such as CPU 110 and application 122. In various embodiments, confidential information 133 stored in secure element 130 is maintained by a set of applets 132, where each applet 132 maintains confidential information 133 for a respective user. For example, as shown, applet 132A may maintain confidential information 133A for a user X, and applet 132B may maintain confidential information 133B for a user Y. In some embodiments, an applet 132 may be supplied by the entity operating external system 170 in order to maintain information 133 desired by the entity and communicate that information 133 in an appropriate format to the external system 170. For example, if user X wants to use a particular credit card, a merchant acquirer associated with the card may provide an applet 132, which is installed in secure element 130 in order to maintain payment information associated with that card. If user X wants to make a purchase using the credit card via computing device 100, applet 132A may communicate information 133A to external system 170 via wireless interface 136 in order to enable payment for the purchase.

In various embodiments, secure element 130 controls access to applets 132 (and thus confidential information 133) by creating one or more instances of a contactless registry service (CRS) applet 134. As used herein, the "contactless registry service (CRS)" refers generally to an application that controls access to a wireless interface such as wireless interface 136. In some embodiments, wireless network interface 136 is a wireless local area network (WLAN) interface such as a Wi-Fi™ interface or Bluetooth™ interface. In some embodiments, interface 136 is a near field communication (NFC) interface. In some embodiments, interface 136 is a wide area network (WAN) such as a cellular interface. Although described as a wireless interface 136, interface 136 may be a wired interface, in some embodiments, such as an Ethernet interface, Fibre Channel interface, etc. As will be described in greater detail with respect to FIGS. 2-4, a user may issue a request, via interface application 122, to use a particular applet 132 that communicates confidential information 133 to an external system 170. In response to this request, CRS 134 may determine whether to permit the requested applet 132 to communicate via wireless interface 136, by interfacing with SEP 140 to authenticate the user (and, in some embodiments determining whether the authenticated user is associated with the requested applet 132).

SEP 140 is a secure circuit configured to authenticate an active user (i.e., the user that is currently using device 100). Accordingly, in various embodiments, SEP 140 is configured to store user authentication information, which may include biometric data (as discussed below) and/or a user name and passcode. In some embodiments, SEP 140 is configured to store the authentication information in a memory external to SEP 140, but in an encrypted manner; however, in other embodiments, SEP 140 is configured to the information in an internal memory. SEP 140 may be configured to authenticate a user requesting to log into device 100. SEP 140 may also receive a request to authenticate a user when the active user requests use of an applet 132. As will be described with FIG. 4A, in some embodiments, SEP 140 may store ownership information that identifies which applets 132 are associated which users. When the secure element 130 gets a request to use a particular applet 132, the secure element 130 (or more specifically CRS 134) may interface with SEP 140 in order to ensure that the requested applet 132 has information 133 belonging to the active user before permitting use of the applet 132. In various embodiments, SEP 140 is configured to establish a secure connection with secure element 130 in order to prevent traffic communicated between units 130 and 140 from being snooped from interconnect 160. In one embodiment, this secure connection is establish using an encryption key that is embedded in secure element 130 and SEP 140 during fabrication of computing device 100. In some embodiments, traffic directed to secure element 130, such as from CPU 110, is routed through SEP 140 and communicated to secure element 130 over the secure connection.

Biosensor 150 is configured to collect biometric data for a user of computing device 100 in order to authenticate the user. Biometric data may be data that uniquely identifies the user among other humans (at least to a high degree of accuracy) based on the user's physical or behavioral characteristics. For example, in some embodiments, sensor 150 is a finger print sensor that captures fingerprint data from the user. In one embodiment, SEP 140 may maintain previously captured fingerprint data of an authorized user and compare it against newly received fingerprint data from sensor 150 in order to authenticate a user. (In another embodiment, biosensor 150 may perform the comparison.) If the fingerprint data matches, SEP 140 may permit performance of a requested service such as using secure element 130. In some embodiments, communications between SEP 140 and biosensor 150 may be encrypted using a key shared between SEP 140 and biosensor 150 such that another circuit (e.g., CPU 110) is unable to view communicated fingerprint data. In some embodiments, other types of biometric data may be captured by sensor 150 such as voice recognition (identifying the particular user's voice), iris scanning, other body part recognition, etc. In some embodiments, biosensor 150 is a camera, which may include an infrared (IR) emitter and an IR camera that are configured to capture multiple flood and depth image frames. When capturing a flood frame, the IR emitter may emit light from a single source, and the IR camera may collect two-dimensional image data from a user's face. When capturing a depth image frame, the IR emitter may project multiple light sources onto a user's face, and the IR camera may capture the reflections of those light sources to determine multiple depth points indicating distances from the IR camera to respective portions of the user's face. In some embodiments, the combination of flood and depth image data may allow for SEP 140 to compare faces in a three-dimensional space. In other embodiments, biosensor 150 is configured to capture a two-dimensional image in the visible-light spectrum. It is noted that SEP 140 may also compare information collected from sources other than sensor 150 in order to verify the identity of a user, in some embodiments. Accordingly, computing device 100 may include other user interface circuits (e.g., a touch screen) configured to receive authentication information (e.g., a passcode or password) from a user, and SEP 140 may verify that the received authentication information is correct.

Figure 2A:
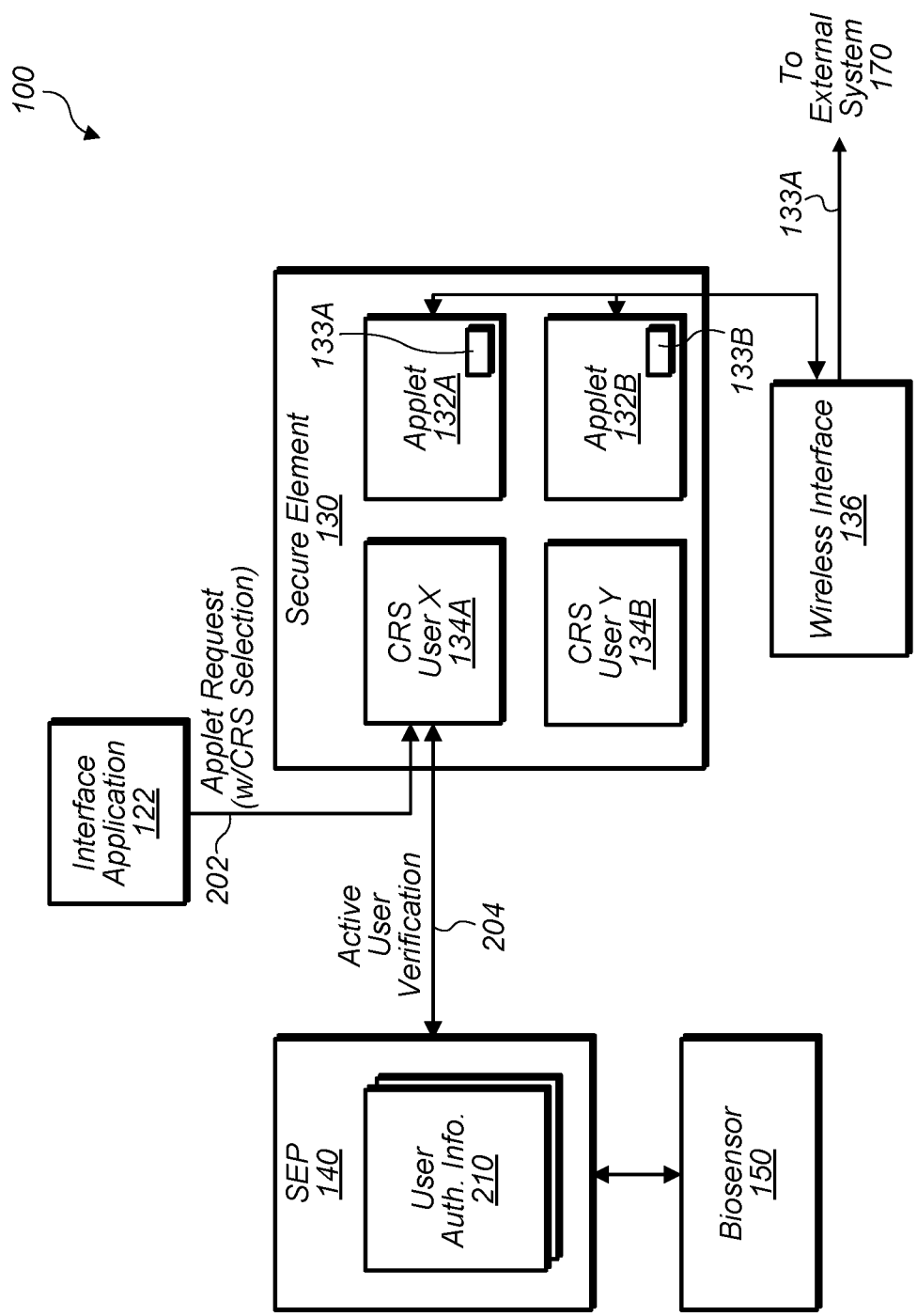
FIG. 2A is a block diagram illustrating an example of a secure element that controls access to user information via multiple contactless registry service (CRS) applets associated with respective users.

Turning now to FIG. 2A, a block diagram of one example in which secure element 130 controls access to user information 133 is depicted. As noted, in various embodiments, CRS 134 is executable to control access to wireless interface 136 by an applet 132. In the illustrated embodiment, secure element 130 controls access to information 133 by instantiating multiple instances of the CRS applet 134 such that each instance is associated with a respective user and executable to control access for that user's applets 132 (i.e., applets 132 that store information 133 of that user). For example, as shown, CRS 134A may be associated with a user X and permit applet 132A to use wireless interface 136 when user X is the active user. CRS 134B may be associated with a user Y and permit applet 132B to use wireless interface 136 when user Y is the active user. In such an embodiment, each CRS 134 tracks which applets 132 belong to its user (and thus are authorized to communicate that user's information 133) by maintaining a list of identifiers for those applets 132.

When a particular user wants to use a particular applet 132 (e.g., user X wants to use applet 132A), the user may select an input in application 122 to cause application 122 to issue an applet request 202 requesting the use of a particular applet 132. In some embodiments, this request 202 may also select the appropriate instance of CRS 134 for that user in order to cause secure element 130 to initiate execution of that CRS 134. In another embodiment, request 202 identifies the active user of computing device 100, so secure element 130 can select the appropriate instance of CRS 134 for execution (e.g., CRS 134A for user X). In still another embodiment, secure element 130 may query SEP 140 for an indication of the active user to select to the appropriate CRS instance.

Once secure element 130 has initiated execution of a CRS 134, the CRS 134 may establish a connection with SEP 140 in order to perform a verification 204 of the active user—i.e., determine that the current user is the one associated with that CRS instance. In some embodiments, SEP 140 performs the verification 204 in response to receiving a request from the CRS 134. For example, SEP 140 may instruct biosensor 150 to collect biometric data, and SEP 140 may compare this collected data with previously stored user authentication information 210 associated with that user. (Notably, in some embodiments in which device 100 includes multiple SE 130s, SEP 140 may store authentication information 210 for users having located confidential information 133 in the multiple SEs 130.) Based on this comparison, SEP 140 may indicate a success or failure to the CRS 134. In another embodiment, SEP 140 may leverage a previously performed verification (e.g., when a user logged into device 100) and indicate the result of that verification. If the verification 204 is successful, the selected CRS 134 may permit the requested applet 132 to communicate its information 133 via wireless interface 136 to external system 170. If the verification 204 fails, the selected CRS 134 may indicate an error to application 122.

In some embodiments, each instance of CRS 134 includes a respective encryption key for communicating with SEP 140 that is unique to its user. Accordingly, CRS 134A may have a first encryption key associated with user X, and CRS 134B may have a second, different encryption key associated with user Y. In such an embodiment, SEP 140 may receive a request to authenticate the active user and begin communicating with the key associated with that user. If the selected CRS 134 is not that of the active user, that CRS 134 may not be able to communicate with SEP 140 because the CRS 134 is not using the key of the active user. Thus, the CRS 134 is unable to perform a user verification 204 resulting in a failure of that verification. As such, the CRS 134 may not permit the requested applet 132 to use wireless interface 136.

Figure 2B:
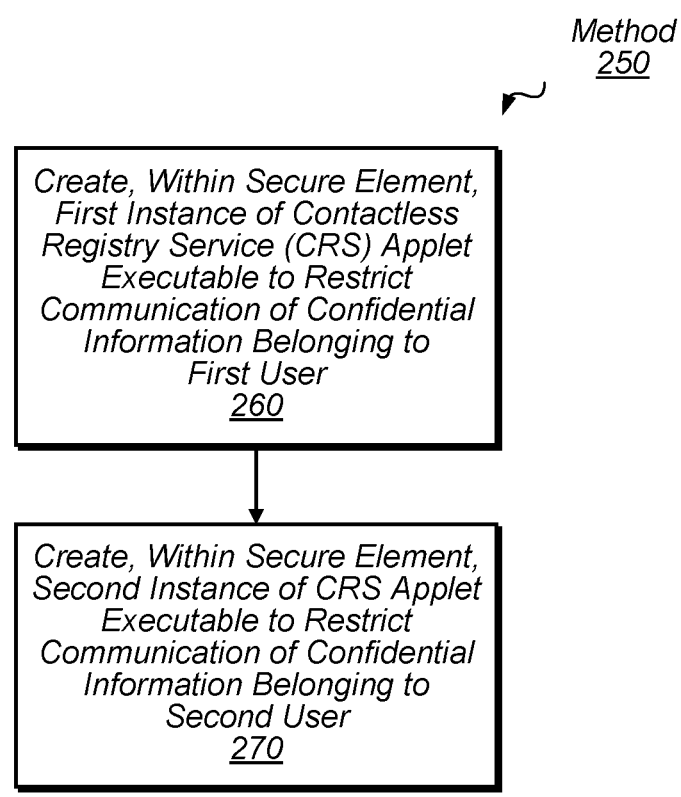
FIG. 2B is a flow diagram illustrating an example of a method performed in conjunction with the secure element.

Turning now to FIG. 2B, a flow diagram of a method 250 is depicted. Method 250 is one embodiment of a method that may be performed by a mobile device having a secure element that supports multiple users.

Method 250 begins at step 260 with the mobile device creating a first instance of a CRS applet (e.g., CRS applet 134A) within the secure element, the first instance of the CRS applet being executable by the secure element to restrict communication of confidential information belonging to a first user via a contactless interface. In step 270, the mobile device creates a second instance of the CRS applet (e.g., CRS applet 134B) within the secure element, the second instance of the CRS applet being executable by the secure element to restrict communication of confidential information belonging to a second user via the contactless interface. In some embodiments, method 250 further includes receiving an indication of an active user of the mobile device, selecting, based on the indication, one of the first and second instances of the CRS applet, and instruct the secure element to execute the selected instance to cause communication of the active user's confidential information via the contactless interface. In some embodiments, a secure circuit coupled to the secure element perform an authentication of the active user of the mobile device and determines, based on the authentication, whether to authorize execution of the selected instance.

Figure 3A:
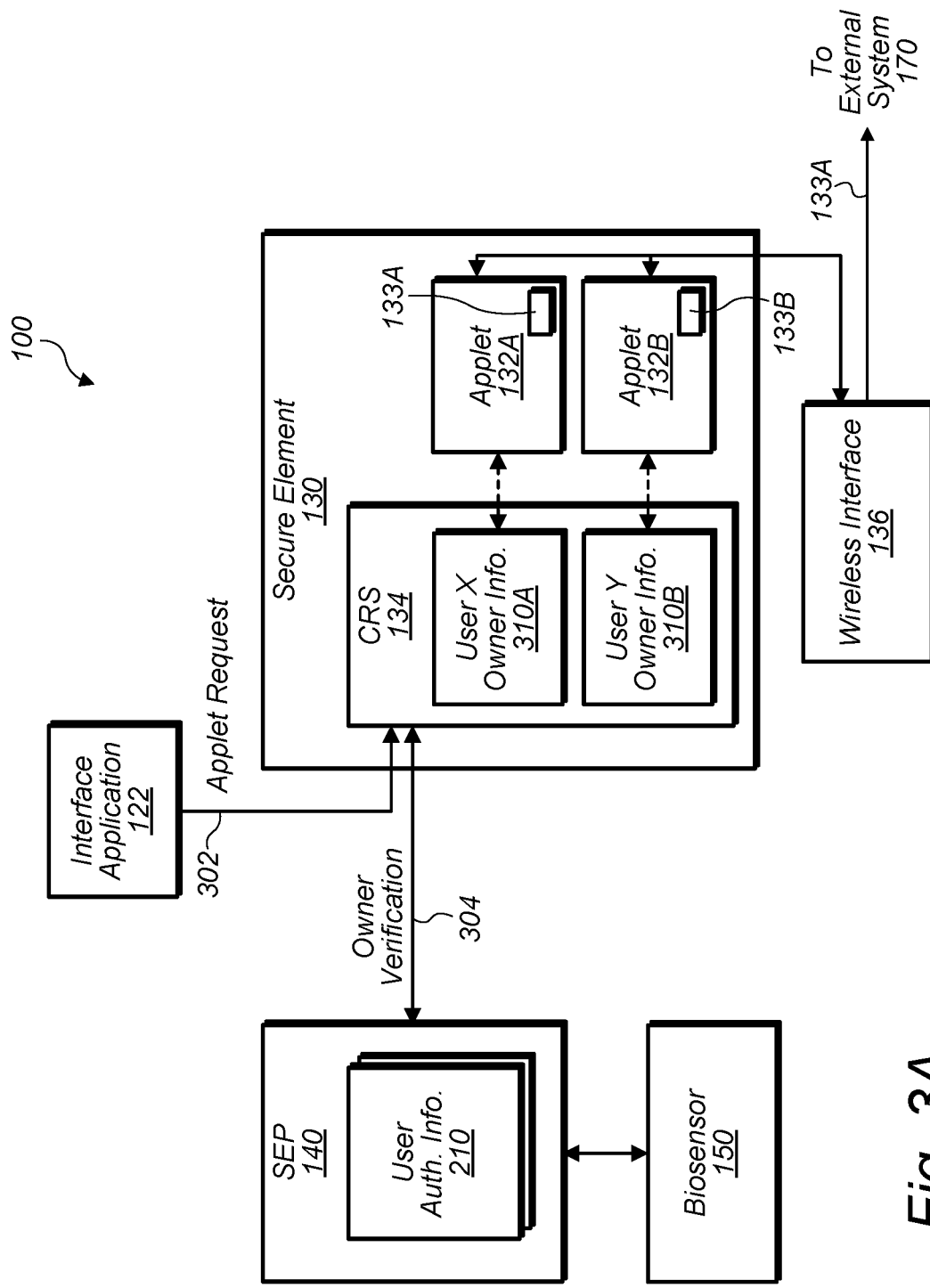
FIG. 3A is a block diagram illustrating an example of a secure element having a CRS applet executable to track ownership of user information.

Turning now to FIG. 3A, a block diagram of another example in which secure element 130 controls access to user information 133 is depicted. In the illustrated embodiment, secure element includes a single instance of CRS 134, which tracks user ownership information 310 for applets 132 and/or information 133. For example, as shown, CRS 134 may include user X ownership information 310A mapping user X to applet 132A and user Y ownership information 310B mapping user Y to applet 132B.

Accordingly, when interface application 122 issues a request 302 to use a particular applet 132, CRS 134 may access owner information 310 to determine the user associated with that applet 132. CRS 134 may then interface with SEP 140 to perform an owner verification 304 in order to ensure that the active user is the owner of the applet 132 (i.e., the one identified by information 310 as being associated with that applet). In some embodiments, verification 304 may include CRS 134 asking for SEP 140 to identify the active user and CRS 134 comparing the identified active user with owner information 310. In another embodiment, CRS 134 may instruct SEP 140 to authenticate a particular user determined from owner information 310. In various embodiments, SEP 140 may perform verification 304 in a similar manner as verification 204 discussed above—e.g., using user authentication information 210 and biosensor 150. If the verification is successful, CRS 134 may allow the requested applet 132 to use wireless interface 136; otherwise, CRS 134 may deny use of wireless interface 136.

Figure 3B:
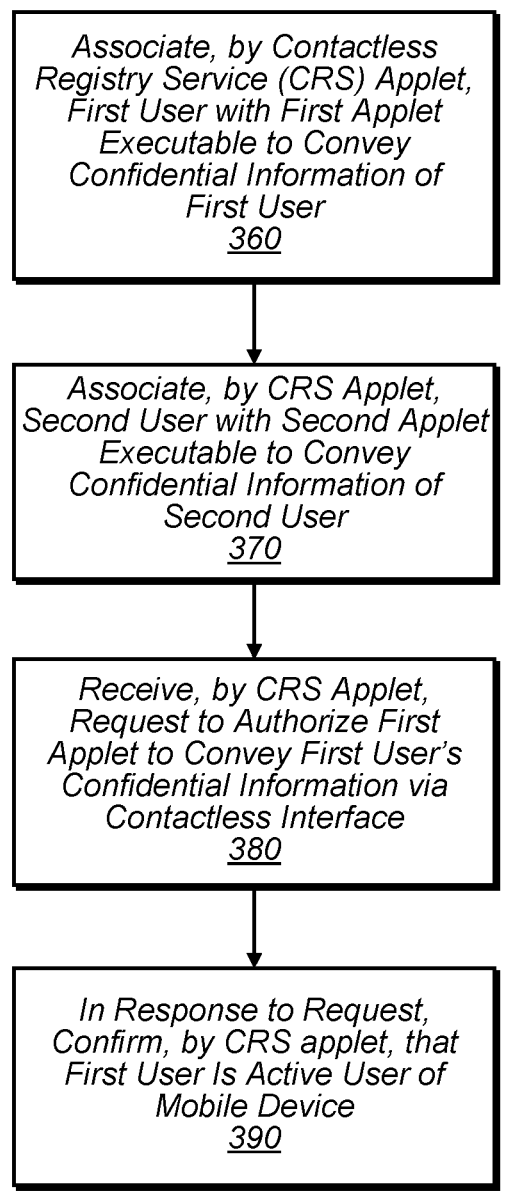
FIG. 3B is a flow diagram illustrating an example of a method performed in conjunction with the secure element.

Turning now to FIG. 3B, a flow diagram of a method 350 is depicted. Method 350 is one embodiment of a method that may be performed by a CRS applet in a secure element within a mobile device to support multiple users. In some embodiments, steps 360-390 may be performed in a different order than shown or concurrently.

Method 350 begins at step 360 with the CRS applet associating (e.g., via information 310A) a first user with a first applet (e.g., applet 132A) executable to convey confidential information of the first user. In step 370, the CRS applet associates (e.g., via information 310B) a second user with a second applet (e.g., applet 132B) executable to convey confidential information of the second user. In step 380, the CRS applet receives a request (e.g., request 302) to authorize the first applet to convey the first user's confidential information via the contactless interface. In step 390, the CRS applet confirms, in response to the request, that the first user is an active user of the mobile device. In some embodiments, a secure circuit determines whether the first user is an active user by comparing biometric information of the active user collected by a biosensor with biometric information of the first user. In such an embodiment, the secure element is configured to confirm that the first user is the active user by sending a request to the secure circuit (e.g., via owner verification 304).

Figure 4A:
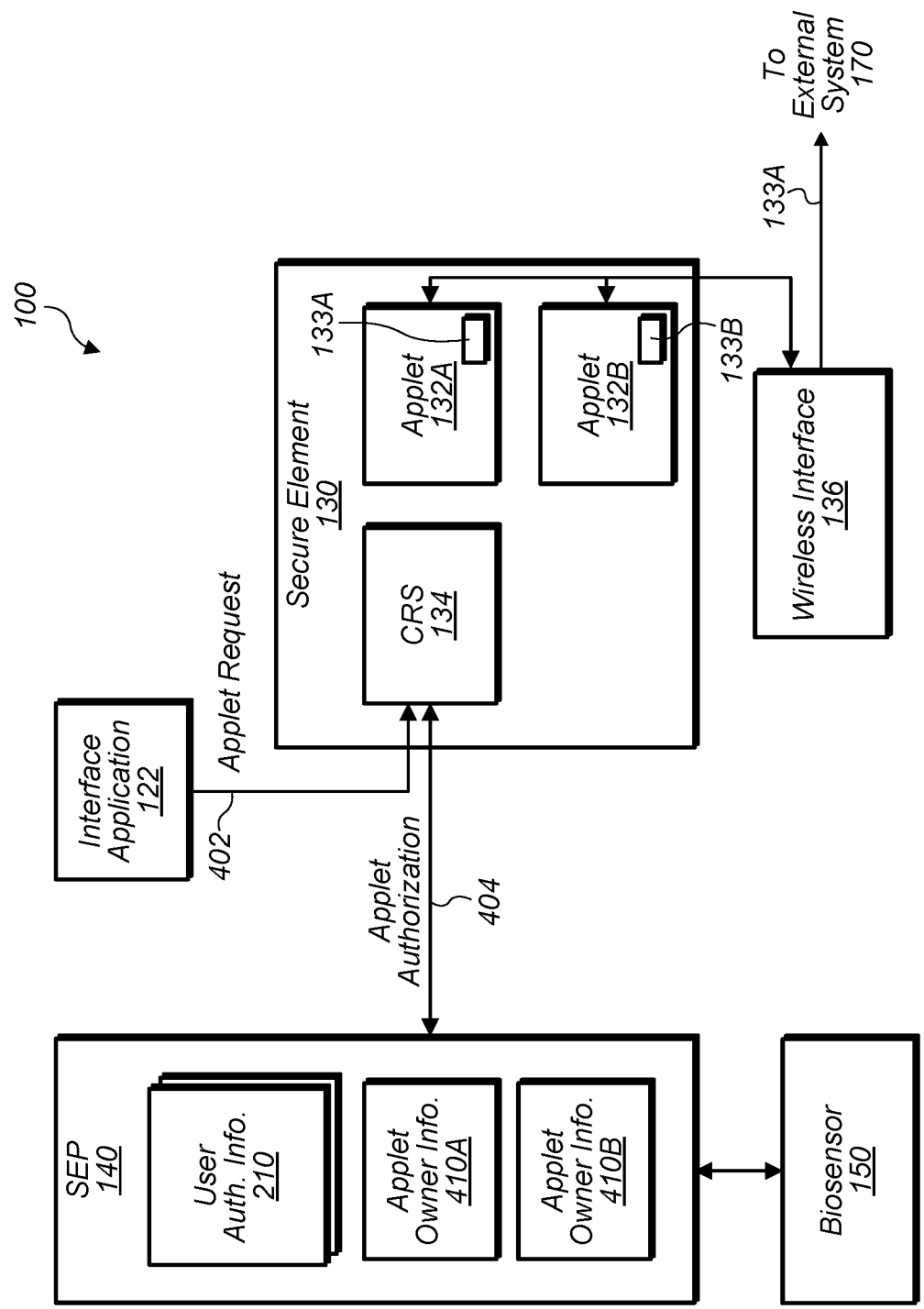
FIG. 4A is a block diagram illustrating an example of a secure element having a CRS applet that interfaces with a secure enclave processor configured to track ownership of user information.

Turning now to FIG. 4A, a block diagram of yet another example in which secure element 130 controls access to user information 133 is depicted. In the illustrated embodiment, SEP 140 is configured to track applet 132 ownership by storing applet owner information 410 (in contrast to CRS 134 as discussed above with FIG. 3A). For example, SEP 140 may store applet owner information 410A identifying the applets 132 owned by user X (e.g., applet 132A as discussed above) and applet owner information 410B identifying applets 132 owned by user Y (e.g., applet 132B as discussed above). In some embodiments in which device 100 includes multiple SE 130s, SEP 140 may store applet owner information 410 for applets 132 in the multiple SEs 130.

Accordingly, when a user wants to use a particular applet 132, interface application 122 may issue a correspond request 402 identifying the applet to CRS 134. (In some embodiments, request 402 may alternatively be received from external system 170 responsive to a user presenting device 100 to the system 170, and cause execution of application 122 to interface with the user.) In response to receiving this request, CRS 134 may perform an applet authorization 404 in which CRS 134 issues a request for SEP 140 to indicate whether execution of the particular applet 132 is authorized. (In another embodiment, application 122 may provide request 402 to SEP 140 directly, rather than sending to CRS 134). In various embodiments, SEP 140 may identify the active user and then determine based on applet owner information 410 whether the requested applet is owned by the active user. In some embodiments, identifying the active user may be performed in a similar manner as discussed above—e.g., using user authentication information 210 and biosensor 150. If SEP 140 determines that the requested applet 132 is associated with the active user (e.g., user X is the active user and information 410A indicates that requested applet 132A is owned by user X), SEP 140 may indicate to CRS 134 that execution of the requested applet 132 is authorized. CRS 134, in turn, may permit the requested applet 132 to use wireless interface 136. If, however, SEP 140 determines that applet 132's owner is not the active user, SEP 140 may decline the authorization request from CRS 134.

Figure 4B:
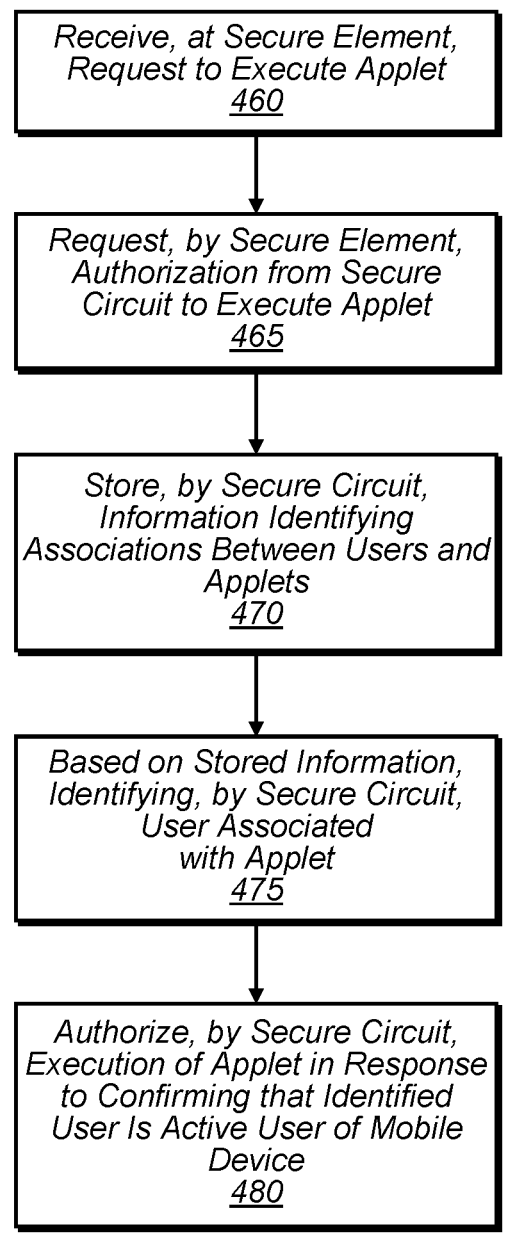
FIG. 4B is a flow diagram illustrating an example of a method performed in conjunction with the secure element.

Turning now to FIG. 4B, a flow diagram of a method 450 is depicted. Method 450 is one embodiment of a method that may be performed by a secure element and a secure circuit in a mobile device to support multiple users. In some embodiments, steps 460-485 may be performed in a different order than shown or concurrently.

Method 450 begins at step 460 with the secure element receiving a request (e.g., request 402) to execute one of the plurality of applets. In some embodiments, the secure element establishes a secure connection with the secure circuit and receives the request to execute the applet via the secure circuit. In some embodiments, the request is received from external system 170 via wireless interface 136 (e.g., responsive to a user presenting device 100 to an NFC reader of system 170). In step 465, the secure element requests authorization from a secure circuit to execute the applet. In step 470, the secure circuit stores information identifying associations between ones of the plurality of users and ones the plurality of applets. In step 475, the secure circuit identifies, based on the stored information, a user associated with the applet. In step 480 the secure circuit authorizes execution of the applet in response to confirming that the identified user is an active user of the mobile device. In some embodiments, the secure circuit confirms that the identified user is an active user of the mobile device by sending a request to a biosensor to collect biometric information of the active user and comparing the collected biometric information with biometric information of the identified user.

Figure 5:
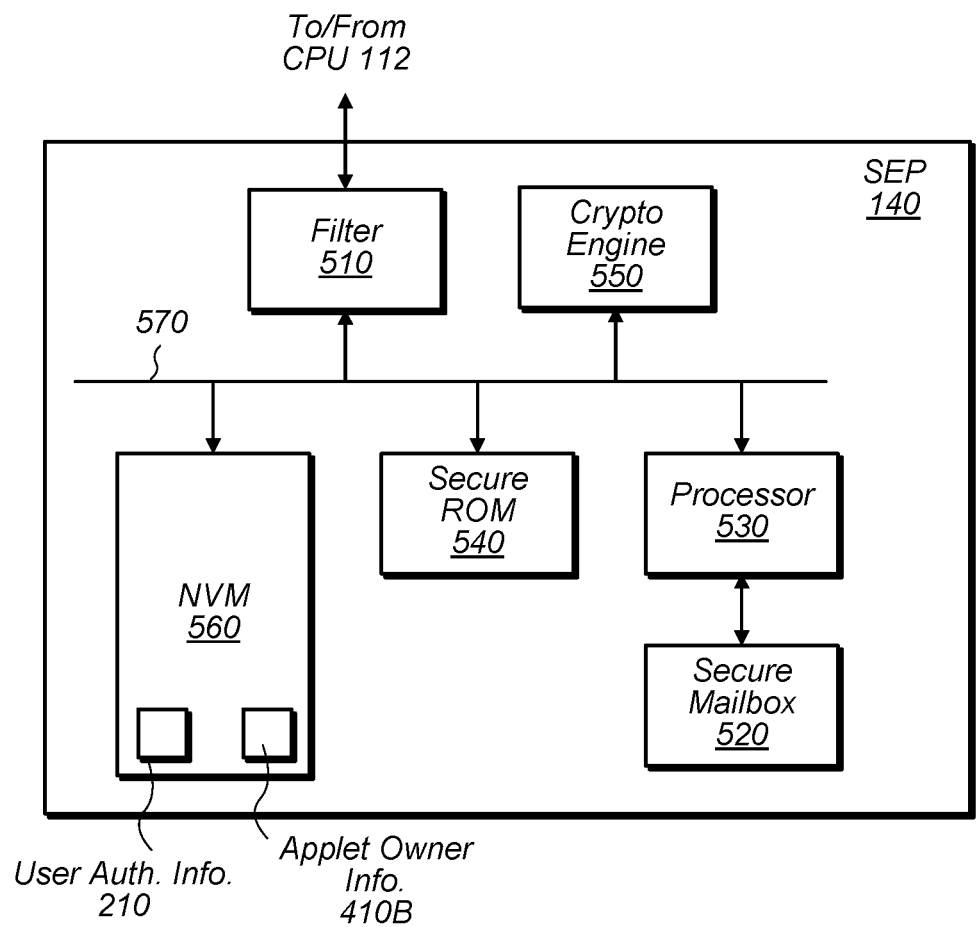
FIG. 5 is a block diagram illustrating an example of a secure enclave processor.

Turning now to FIG. 5, a block diagram of additional components in SEP 140 is depicted. (In some embodiments, functionality described below with respect to SEP 140 may be implemented by secure element 130.) In the illustrated embodiment, SEP 140 includes a filter 510, secure mailbox 520, processor 530, secure ROM 540, cryptographic engine 550, and a non-volatile memory 560 coupled together via an interconnect 570. In some embodiments, SEP 140 may include more (or less) components than shown in FIG. 5. As noted above, SEP 140 is a secure circuit that protects an internal, resource such as components user authentication information 210 and/or applet owner information 410. As discussed below, SEP 140 implements a secure circuit through the use of filter 510 and secure mailbox 520.

Filter 510 is circuitry configured to tightly control access to SEP 140 to increase the isolation of the SEP 140 from the rest of the computing device 100, and thus the overall security of the device 100. More particularly, in one embodiment, filter 510 may permit read/write operations from a CPU 110 (or other peripherals on a fabric coupling CPU 110 and SEP 140) to enter SEP 140 only if the operations address the secure mailbox 520. Other operations may not progress from the interconnect 160 into SEP 140. Even more particularly, filter 510 may permit write operations to the address assigned to the inbox portion of secure mailbox 520, and read operations to the address assigned to the outbox portion of the secure mailbox 520. All other read/write operations may be prevented/filtered by the filter 510. In some embodiments, filter 510 may respond to other read/write operations with an error. In one embodiment, filter 510 may sink write data associated with a filtered write operation without passing the write data on to local interconnect 570. In one embodiment, filter 510 may supply nonce data as read data for a filtered read operation. Nonce data (e.g., "garbage data") may generally be data that is not associated with the addressed resource within the SEP 140. Filter 510 may supply any data as nonce data (e.g. all zeros, all ones, random data from a random number generator, data programmed into filter 510 to respond as read data, the address of the read transaction, etc.).

In various embodiments, filter 510 may only filter incoming read/write operations. Thus, the components of the SEP 140 may have full access to the other components of computing device 100 including CPU 110, memory 120, and biosensor 150. Accordingly, filter 510 may not filter responses from interconnect 160 that are provided in response to read/write operations issued by SEP 140.

Secure mailbox 520 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 110. The outbox may store write data from write operations sourced by processor 530. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., application 122) may request services of SEP 140 via an application programming interface (API) supported by an operating system of computing device 100—i.e., a requester may make API calls that request services of SEP 140. These calls may cause corresponding requests to be written to mailbox mechanism 520, which are then retrieved from mailbox 520 and analyzed by processor 530 to determine whether it should service the requests.

SEP processor 530 is configured to process commands received from various sources in computing device 100 (e.g. from processor 110) and may use various secure peripherals to accomplish the commands. Processor 530 may then execute instructions stored in ROM 540 to process information 210 and/or 410.

Secure ROM 540 is a memory configured to store program instruction for booting SEP 140. In some embodiments, ROM 540 may respond to only a specific address range assigned to secure ROM 540 on local interconnect 570. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 140. In some embodiments, secure ROM 540 may include other software executed by SEP processor 530 during use. This software may include the program instructions to process inbox messages and generate outbox messages, code to interface with secure element 130, etc.

Cryptographic engine 550 is circuitry configured to perform cryptographic operations for SEP 140, including key generation as well as encryption and decryption using keys in NVM 560. Cryptographic engine 550 may implement any suitable encryption algorithm such as DES, AES, RSA, etc. In some embodiments, engine 550 may further implement elliptic curve cryptography (ECC). In various embodiments, engine 550 is responsible for encrypting and decrypting traffic send to secure element 130 discussed above.

NVM 560 is a local memory (i.e., internal memory) configured to store confidential information used by SEP 140 such as user authentication information 210 and applet owner information 410 as discussed above. In other embodiments, SEP 140 is configured to store information such as user authentication information 210 and applet owner information 410 in a memory external to SEP 140 (e.g., memory 120), but in an encrypted manner such that SEP 140 is the only entity able to access the information.

Figure 6:
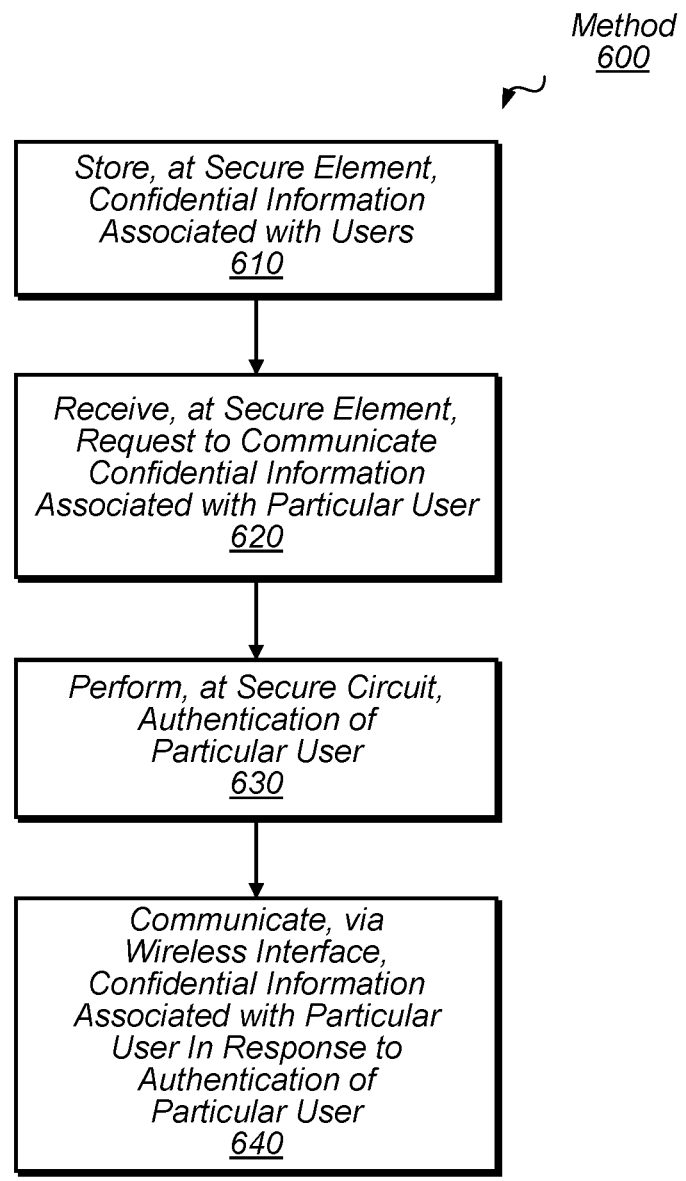
FIG. 6 is a flow diagram illustrating an example of a method.

Turning now to FIG. 6, a flow diagram of a method 600 is depicted. Method 600 is one embodiment of a method that may be performed by mobile device having a secure circuit and a secure element supporting multiple users. In some embodiments, steps 610-640 may be performed in a different order than shown or concurrently.

Method 600 begins in step 610 with the secure element (e.g., secure element 130) storing confidential information (e.g., information 133) associated with a plurality of users. In step 620, the secure element receives a request to communicate the confidential information associated with a particular one of the plurality of users. In step 630, the secure element communicates, via the wireless interface (e.g., interface 136), the confidential information associated with the particular user in response to an authentication of the particular user. In step 640, the secure circuit (e.g., SEP 140) performs the authentication of the particular user.

Exemplary Computer System

Figure 7:
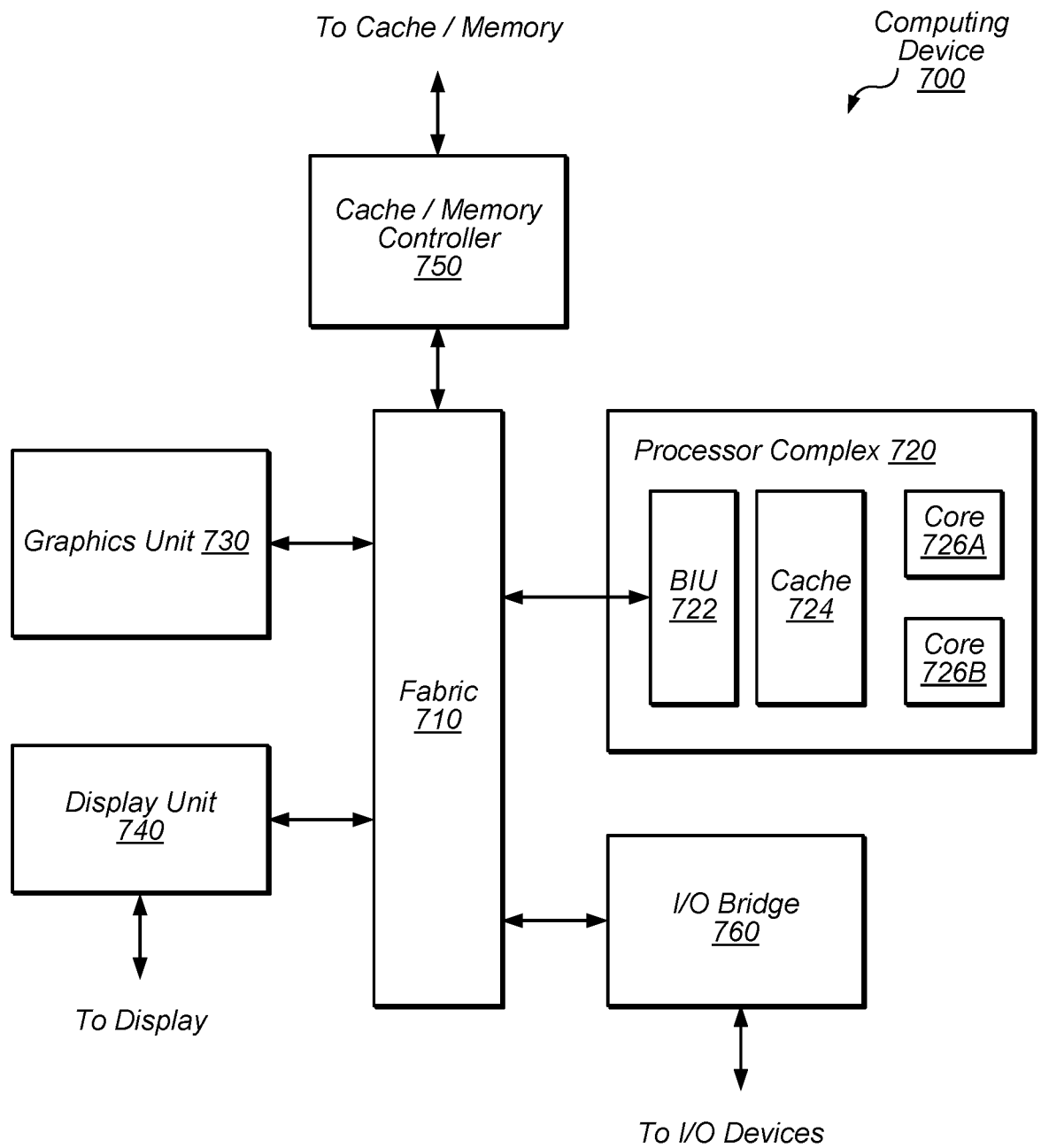
FIG. 7 is a block diagram illustrating one embodiment of an exemplary computer system.

Turning now to FIG. 7, a block diagram illustrating an exemplary embodiment of a device 700 is shown. Device 700 is one embodiment of a computing system that may implement functionality with respect to computing device 100 and/or external system 170. In some embodiments, elements of device 700 may be included within a system on a chip (SOC). In some embodiments, device 700 may be included in a mobile device, which may be battery-powered. In the illustrated embodiment, device 700 includes fabric 710, processor complex 720, graphics unit 730, display unit 740, cache/memory controller 750, input/output (I/O) bridge 760.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally. As used herein, the term "coupled to" may indicate one or more connections between elements, and a coupling may include intervening elements. For example, in FIG. 7, graphics unit 730 may be described as "coupled to" a memory through fabric 710 and cache/memory controller 750. In contrast, in the illustrated embodiment of FIG. 7, graphics unit 730 is "directly coupled" to fabric 710 because there are no intervening elements.

In the illustrated embodiment, processor complex 720 includes bus interface unit (BIU) 722, cache 724, and cores 726A and 726B. In various embodiments, processor complex 720 may include various numbers of processors, processor cores and/or caches. For example, processor complex 720 may include 1, 2, or 4 processor cores, or any other suitable number. In one embodiment, cache 724 is a set associative L2 cache. In some embodiments, cores 726A and/or 726B may include internal instruction and/or data caches. In some embodiments, a coherency unit (not shown) in fabric 710, cache 724, or elsewhere in device 700 may be configured to maintain coherency between various caches of device 700. BIU 722 may be configured to manage communication between processor complex 720 and other elements of device 700. Processor cores such as cores 726 may be configured to execute instructions of a particular instruction set architecture (ISA), which may include operating system instructions and user application instructions. These instructions may be stored in computer readable medium such as a memory coupled to memory controller 750 discussed below.

Graphics unit 730 may include one or more processors and/or one or more graphics processing units (GPU's). Graphics unit 730 may receive graphics-oriented instructions, such as OPENGL®, Metal, or DIRECT3D® instructions, for example. Graphics unit 730 may execute specialized GPU instructions or perform other operations based on the received graphics-oriented instructions. Graphics unit 730 may generally be configured to process large blocks of data in parallel and may build images in a frame buffer for output to a display. Graphics unit 730 may include transform, lighting, triangle, and/or rendering engines in one or more graphics processing pipelines. Graphics unit 730 may output pixel information for display images.

Display unit 740 may be configured to read data from a frame buffer and provide a stream of pixel values for display. Display unit 740 may be configured as a display pipeline in some embodiments. Additionally, display unit 740 may be configured to blend multiple frames to produce an output frame. Further, display unit 740 may include one or more interfaces (e.g., MIPI® or embedded display port (eDP)) for coupling to a user display (e.g., a touchscreen or an external display).

Cache/memory controller 750 may be configured to manage transfer of data between fabric 710 and one or more caches and/or memories. For example, cache/memory controller 750 may be coupled to an L3 cache, which may in turn be coupled to a system memory. In other embodiments, cache/memory controller 750 may be directly coupled to a memory. In some embodiments, cache/memory controller 750 may include one or more internal caches. Memory coupled to controller 750 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 750 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 720 to cause device 700 to perform functionality described herein.

I/O bridge 760 may include various elements configured to implement universal serial bus (USB) communications, security, audio, and/or low-power always-on functionality, for example. I/O bridge 760 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 760. For example, these devices may include various types of wireless communication (e.g., Wi-Fi™, Bluetooth™, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mobile device, comprising:
   a contactless interface;
   a secure element associated with the contactless interface, wherein the secure element is configured to:
      store a first contactless registry service (CRS) applet and a first applet within the secure element, wherein the first CRS applet is executable by the secure element to restrict communication of a first confidential information associated with the first applet via the contactless interface, wherein the first applet stores the first confidential information; and
      store a second CRS applet and a second applet within the secure element, wherein the second CRS applet is executable by the secure element to restrict communication of a second confidential information associated with the second applet via the contactless interface, wherein the second applet stores the second confidential information;
   wherein the mobile device further comprises:
      a processor; and
      a memory having program instructions stored therein that, when executed by the processor, cause the processor to:
      receive a first request from a user to use the first applet;
      in response to receiving the first request, select the first CRS applet, wherein selecting the first CRS applet further comprises instructing the secure element to execute the selected first CRS applet to cause communication of the first confidential information associated with the selected first CRS applet;
   wherein the secure element is further configured to:
      execute the first CRS applet;
      execute the first applet; and
      communicate the first confidential information stored in the first applet to an external system via the contactless interface for the first request.

2. The mobile device of claim 1, wherein receiving the first request further comprises:
   receiving an indication of the user of the mobile device; and
   based on the indication, selecting the first CRS applet.

3. The mobile device of claim 1, wherein the program instructions that, when executed by the processor, further cause the processor to:
   in response to the first request, cause performance of an authentication of the user of the mobile device.

4. The mobile device of claim 3, further comprising:
   a secure circuit coupled to the secure element,
   wherein the secure circuit is configured to:
      perform the authentication of the user of the mobile device; and
      based on the authentication, determine whether to authorize execution of the selected first CRS applet.

5. The mobile device of claim 3, further comprising:
   a secure circuit coupled to the secure element, wherein the secure circuit is configured to:
      perform the authentication of the user of the mobile device; and
      communicate a result with the executed first CRS applet.

6. The mobile device of claim 5, wherein the secure circuit is further configured to:
   communicate securely with the executed first CRS applet using a cryptographic key.

7. The mobile device of claim 3, further comprising:
   a biosensor configured to collect biometric information from the user of the mobile device to perform the authentication.

8. The mobile device of claim 1, wherein the program instructions that, when executed by the processor, further cause the processor to:
   receive the first request from an interface application that presents a user interface to the user of the mobile device.

9. The mobile device of claim 1, wherein the first CRS applet is executable by the secure element to:
   maintain a list of identifiers of applets associated with the first CRS applet.

10. The mobile device of claim 1, wherein the contactless interface is a near field communication interface.

11. A non-transitory computer readable medium storing program instructions that, when executed by one or more processors of a device, cause the one or more processors to perform operations comprising:
  storing, within a secure element of the device, a first contactless registry service (CRS) applet and a first applet, wherein the first CRS applet is executable by the secure element to restrict communication of a first confidential information associated with the first applet via a contactless interface of the device, wherein the first applet stores the first confidential information;
  storing, within the secure element, a second CRS applet and a second applet, wherein the second CRS applet is executable by the secure element to restrict communication of second confidential information associated with the second applet via the contactless interface, wherein the second applet stores the second confidential information;
  receiving a first request from a user to use the first applet;
  in response to receiving the first request, selecting the first CRS applet, wherein selecting the first applet comprises instructing the secure element to execute the selected first CRS applet to cause communication of the first confidential information associated with the selected first CRS applet;
  executing, via the secure element, the first CRS applet;
  executing, via the secure element, the first applet; and
  communicating, via the contactless interface, the first confidential information stored in the first applet to an external system via the contactless interface for the first request.

12. The non-transitory computer readable medium of claim 11, wherein the program instructions that, when executed by the one or more processors, further cause the one or more processors to perform additional operations comprising:
  causing, via the executed first CRS applet, a verification that the user of the device has been authenticated.

13. The non-transitory computer readable medium of claim 12, the program instructions that, when executed by the one or more processors, further cause the one or more processors to perform additional operations comprising:
  establishing, via the executed first CRS applet, a secure connection with a secure circuit configured to authenticate the user.

14. The non-transitory computer readable medium of claim 11, the program instructions that, when executed by the one or more processors, further cause the one or more processors to perform additional operations comprising:
  storing, via the selected first CRS applet, a list of applets associated with authorized to communicate confidential information via the contactless interface.

15. The non-transitory computer readable medium of claim 11, the program instructions that, when executed by the one or more processors, further cause the one or more processors to perform additional operations comprising:
  receiving the first request from an interface application that receives a menu selection from the user of the device.

16. A method, comprising:
  storing, by a mobile device and within a secure element of the mobile device, a first applet and a first contactless registry service (CRS) applet, wherein the first CRS applet is executable by the secure element to restrict communication of a first confidential information associated with the first applet via a contactless interface of the device, wherein the first applet stores the first confidential information;
  storing, by the mobile device and within the secure element, a second applet and a second CRS applet, wherein the second CRS applet is executable by the secure element to restrict communication of second confidential information associated with the second applet via the contactless interface, wherein the second applet stores the second confidential information;
  receiving, by the mobile device, a first request from a user to use the first applet;
  in response to the first request, selecting, by the mobile device, the first CRS applet, wherein the selecting comprises instructing, by the mobile device, the secure element to execute the selected first CRS applet to cause communication of first confidential information of the first applet associated with the selected first CRS applet;
  executing, by the mobile device via the secure element, the first CRS applet;
  executing, by the mobile device via the secure element, the first applet; and
  communicating, via a contactless interface of the mobile device, the first confidential information stored in the first applet to an external system via the contactless interface for the first request.

17. The method of claim 16, further comprising:
  prior to communicating of the first confidential information of the first applet via the contactless interface, performing, by the mobile device, an authentication of the user of the mobile device.

18. The method of claim 17, wherein the performing the authentication comprises using a biosensor that collects biometric information from the user of the mobile device.

19. The method of claim 18, wherein the performing the authentication further comprises comparing, by the mobile device via a secure circuit of the mobile device, the collected biometric information with biometric information of an authorized user.

20. The method of claim 18, wherein the biosensor includes an infrared (IR) emitter and an IR camera configured to capture images of a biometric.

* * * * *